United States Patent [19]

Tamura et al.

[11] 4,298,522

[45] Nov. 3, 1981

[54] DIPHENYLAMINE DERIVATIVES AND DEGRADATION INHIBITORS FOR RUBBER POLYMERS

[75] Inventors: Mitsuhiro Tamura, Sagamihara; Tetsuo Ohishi, Tokyo; Hiroshi Sakurai, Yokohama, all of Japan

[73] Assignee: Nippon Zeon Co. Ltd., Tokyo, Japan

[21] Appl. No.: 160,855

[22] Filed: Jun. 19, 1980

[30] Foreign Application Priority Data

Jun. 21, 1979 [JP] Japan .................................. 54/78599
Jun. 21, 1979 [JP] Japan .................................. 54/78600

[51] Int. Cl.$^3$ .......................... C08K 5/43; C08K 5/18; C07C 143/80; C07C 87/58
[52] U.S. Cl. ............................ 260/45.9 QB; 526/288; 526/310; 526/312; 564/92; 564/95; 564/433; 564/434
[58] Field of Search ................... 564/92, 95, 433, 434; 260/45.9 QB; 526/292, 310, 312, 288

[56] References Cited

U.S. PATENT DOCUMENTS

| | | | |
|---|---|---|---|
| 2,200,756 | 9/1940 | Messer et al. | 526/310 |
| 2,218,185 | 10/1940 | Ter Horst | 564/92 |
| 2,278,559 | 3/1943 | Paul | 564/433 |
| 2,342,136 | 2/1944 | Gibbs | 564/433 |
| 2,349,749 | 5/1944 | Paul | 564/92 |
| 2,393,156 | 1/1946 | Gibbs | 564/433 |
| 2,520,917 | 9/1950 | Dickey et al. | 526/288 |
| 2,631,995 | 3/1953 | Bruson | 526/310 |
| 2,691,640 | 12/1954 | Patterson et al. | 526/310 |
| 2,784,204 | 5/1957 | Heyna et al. | 564/433 |
| 2,875,162 | 2/1959 | Morris | 526/310 |
| 2,943,112 | 6/1960 | Popoff et al. | 564/433 |
| 3,116,257 | 12/1963 | Klass | 564/92 |
| 3,314,927 | 4/1967 | Kelley | 526/312 |
| 3,668,254 | 6/1972 | D'Amico et al. | 564/433 |
| 4,008,202 | 2/1977 | Evani et al. | 526/312 |
| 4,180,629 | 12/1979 | Bleha et al. | 526/312 |

OTHER PUBLICATIONS

Rubber Chemistry & Technology–vol. 46, No. 1, 1976—Kline et al.

*Primary Examiner*—V. P. Hoke
*Attorney, Agent, or Firm*—Sherman & Shalloway

[57] ABSTRACT

A diphenylamine derivative of the general formula

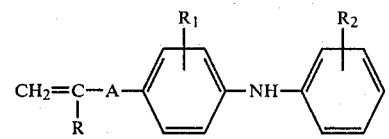

wherein R represents a hydrogen atom or a methyl group, $R_1$ and $R_2$, independently from each other, represent a hydrogen atom, a chlorine atom, a bromine atom, or a hydrocarbon radical having 1 to 12 carbon atoms, and A represents

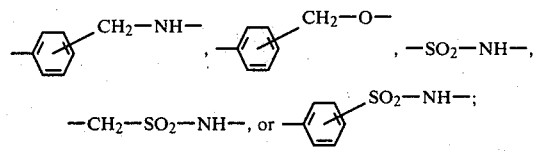

and a degradation inhibitor for rubbery polymers comprising the aforesaid diphenylamine derivative as an active ingredient.

12 Claims, No Drawings

DIPHENYLAMINE DERIVATIVES AND DEGRADATION INHIBITORS FOR RUBBER POLYMERS

This invention relates to novel diphenylamine derivatives, and to degradation inhibitors for rubbery polymers, which contain such diphenylamine derivatives as active ingredients.

Generally, rubbery polymeric compounds, particularly compounds having an unsaturated bond in the molecular chain undergo degradation, for example softening or hardening, under the action of ozones, oxygen, light, heat, etc., and become inferior in various properties. Very often, such degradation poses a problem in practical application. It has been the previous practice to add various degradation inhibitors of the phenol or amine type to these compounds so as to inhibit such degradation, and fairly satisfactory results have been obtained under relatively low temperature conditions. In recent years, however, rubber products have been used under more rigorous service conditions. For example, the temperature in the neighborhood of an automobile engine is higher than before as a result of improvements in engines for control of automotive exhaust gases. Accordingly, use of conventional degradation inhibitors makes it very difficult to provide rubber products which can withstand degradation in practical application.

It is an object of this invention therefore to provide a degradation inhibitor capable of effectively inhibiting degradation of rubbery polymers under severe conditions.

It has now been found that a certain class of novel diphenylamine derivatives has utility as a degradation inhibitor.

According to this invention, there are provided novel diphenylamine derivatives of the general formula

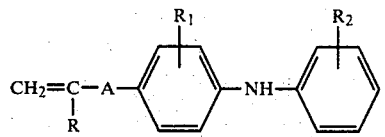

wherein R represents a hydrogen atom or a methyl group, $R_1$ and $R_2$, independently from each other, represent a hydrogen atom, a chlorine atom, a bromine atom or a hydrocarbon radical having 1 to 12 carbon atoms, and A represents

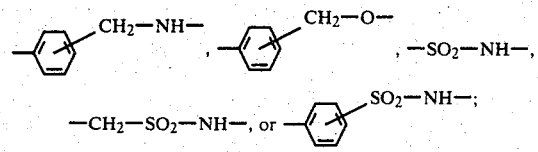

and a degradation inhibitor for rubber polymers, said inhibitor comprising the aforesaid diphenylamine derivative as an active ingredient.

These diphenylamine derivatives can be easily prepared by ordinary organic synthetic methods.

For example, such a diphenylamine derivative can be prepared by (1) reacting p-phenylene diamine or its derivative having $R_1$ and/or $R_2$ as substituents with a halomethylstyrene or halomethyl-α-methylstyrene (when A in the above formula is the group

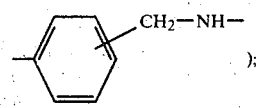

or (2) reacting p-hydroxydiphenylamine or its derivative having $R_1$ and/or $R_2$ as substituents with a halomethylstyrene or halomethyl-α-methylstyrene (when A in the above formula is the group

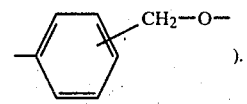

Specifically, in such a method, the starting material is dissolved in a suitable solvent such as methanol, ethanol, benzene or toluene, and an equivalent amount or an excessive amount of the halomethylstyrene or halomethyl-α-methylstyrene is added dropwise to the solution at an elevated temperature with stirring. As a result, the final product is precipitated and can be easily recovered as a precipitate.

There can also be employed (3) a method which comprises reacting p-aminodiphenylamine or its derivative having $R_1$ and/or $R_2$ as substituents with 4-vinylbenzenesulfonyl chloride or isopropenylbenzenesulfonyl chloride or a ring-substituted derivative thereof (when A in the above formula is the group

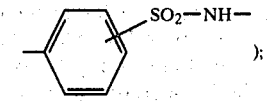

or (4) a method which comprises reacting the starting material mentioned in (3) with vinylsulfonyl chloride or isopropenylsulfonyl chloride (when A in the above formula is the group $—SO_2—NH—$); or (5) reacting the aforesaid starting material with allylsulfonyl chloride or methallylsulfonyl chloride (when A in the above formula is the group $—CH_2—SO_2—NH—$).

In these methods, such a sulfonyl cyloride as mentioned above is dissolved in a suitable solvent, for example an aromatic solvent (particularly toluene), and an equivalent amount or an excessive amount of p-aminodiphenylamine or its derivative is added dropwise to this solution in the presence of a hydrogen chloride acceptor with cooling and stirring. As a result, the final product can be easily recovered as a precipitate.

Examples of the diphenylamine derivative include
4-anilino-N-(4-vinylbenzyl)aniline,
4-(4-methylanilino)-N-(4-vinylbenzyl)aniline,
4-anilinophenyl-4-vinylbenzyl ether,
4-(4-methylanilino)phenyl-4-vinylbenzyl ether,
N-(4-anilino)phenyl-4-vinylbenzenesulfonamide,
N-[4-(4-methylanilino)]phenyl-4-vinylbenzenesulfonamide,
N-(4-anilino)phenyl-vinylsulfonamide,
N-[4-(4-methylanilino)phenyl]-vinylsulfonamide,
N-(4-anilino)phenylisopropenylsulfonamide, and
N-[4-(4-methylanilino)]phenylisopropenylsulfonamide.

The diphenylamine derivatives of this invention are very effective for inhibiting degradation of rubber products which are subject to severe service conditions (high temperatures, oils, etc.).

There is no particular restriction on the manner of using the diphenylamine derivatives of this invention as degradation inhibitors for rubbery polymers. Such a diphenylamine derivative may be simply added to a rubbery polymer. Or it may be copolymerized with monomers for a rubbery polymer to bond it in the polymer molecular chain as a segmeric unit of the general formula

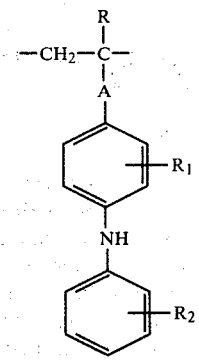

wherein R, $R_1$, $R_2$ and A are as defined above.

The amount of the diphenylamine derivative to be added to a rubbery polymer as a degradation inhibitor is not particularly limited. Usually, it is 0.01 to 10 parts by weight, preferably 0.1 to 5 parts by weight, per 100 parts by weight of the rubbery polymer.

There is no particular restriction on rubbery polymers to which the degradation inhibitor of this invention is applicable. The degradation inhibitor in accordance with this invention, however, is remarkably effective when applied to diene-type polymers which are susceptible to heat degradation, for example polybutadiene, styrene/butadiene copolymer, acrylonitrile/butadiene copolymer, polyisoprene, polychloroprene, and modified polymers of these (e.g., hydrogenation products thereof).

There is neither any particular restriction on the method of incorporating the diphenylamine derivative as the degradation inhibitor of this invention in a rubbery polymer. For example, it may be admixed with a latex or solution of the rubbery polymer. Or it may be mixed with a solid rubber in conventional mixers such as a mixing roll or a Banbury mixer.

When the diphenylamine derivative of this invention is to be copolymerized with monomers in a free radical polymerization system so as to bond it to the molecular chain of the rubbery polymer in the aforesaid segmeric unit, the diphenylamine derivative is used in an amount of 0.01 to 20 parts by weight, preferably 0.1 to 10 parts by weight, per 100 parts by weight of the entire monomers. The monomers to be copolymerized with the diphenylamine derivative of this invention may be conjugated diene monomers such as 1,3-butadiene, isoprene, 1,3-pentadiene and chloroprene, or mixtures thereof with monoethylenically unsaturated monomers. Examples of the monoethylenically unsaturated monomers include unsaturated nitriles such as acrylonitrile, methacrylonitrile and α-chloroacrylonitrile; monovinylidene aromatic hydrocarbons such as styrene, alkylstyrenes, chlorostyrene and 2,4-dibromostyrene; unsaturated carboxylic acids such as acrylic acid, methacrylic acid, crotonic acid, itaconic acid and maleic acid; esters of unsaturated carboxylic acids such as methyl acrylate, butyl acrylate, 2-ethylhexyl acrylate and methyl methacrylate; unsaturated aldehydes such as acrolein and methacrolein; vinyl esters such as vinyl acetate; unsaturated amines such as vinylpyridine; and vinylidene halides such as vinylidene chloride and vinylidene bromide.

One example of the free radical initiator includes those known as "redox" initiators, which are composed of suitable combinations of ferrous sulfate, sodium formaldehyde sulfoxylate, and organic peroxides such as cumene hydroperoxide and para-menthane hydroperoxide. Other initiators such as azobisisobutyronitrile, benzoyl peroxide, hydrogen persulfate and potassium persulfate can also be used in certain polymerization systems.

The rubbery polymer having incorporated therein the diphenylamine derivative of this invention or the rubbery copolymer having the diphenylamine derivative copolymerized therewith is optionally mixed with other rubbery polymers such as natural rubber, styrene/butadiene rubber, butadiene rubber, isoprene rubber, acrylonitrile/butadiene rubber, or chloroprene rubber. The mixture is then compounded with required chemicals such as reinforcing agents, fillers, plasticizers, softening agents, vulcanizing agents, stabilizers and antioxidants, and molded and cured to form a final product.

The rubbery polymer having the diphenylamine derivative added thereto or the rubbery polymer having the diphenylamine derivative copolymerized therewith can also be used widely in the form of an unvulcanized rubber or a latex.

The degradation-inhibiting effect of the degradation inhibitor of this invention synergistically increases when the diphenylamine derivative of this invention is used as a degradation inhibitor for rubbery polymers in combination with (1) a mercaptobenzimidazole of the formula

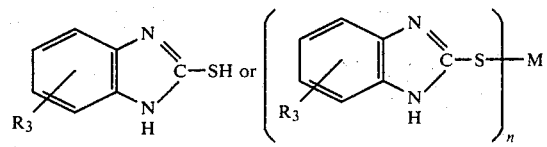

wherein $R_3$ represents a hydrogen atom, a chlorine atom, a bromine atom or a hydrocarbon radical having 1 to 12 carbon atoms, M represents a metal of Group II or VIII of the periodic table, and n represents 2 or 3, such as 2-mercaptobenzimidazole or the Ni or Zn salt thereof, or (2) an N-alkylsubstituted dithiocarbamic acid or its salt expressed by the general formula

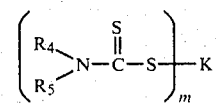

wherein $R_4$ and $R_5$ represent a hydrogen atom or a hydrocarbon radical having 1 to 12 carbon atoms, K represents a metal of Group I, II, IV, VI or VIII, and m represents 1 to 4, such as nickel dibutyldithiocarbamate or zinc diethyldithiocarbamate, or (3) a thioether compound such as dilauryl thiodipropionate, distearyl thiodipropionate, phenyl-(3-phenylthiopropionate), ethane-1,2-bis(3-n-dodecylthiopropionate), ethane-1,2-bis(3-n-dodecylthio-2-methylpropionate), and 3,6,9-trioxaundecene-1,11-bis(3-n-dodecylthiopropionate), or (4) an amine compound such as N,N'-diphenyl-p-phenylenediamine, N-isopropyl-N'-phenyl-p-phenylenediamine, N-cyclohexyl-N'-phenyl-p-phenylenediamine, N,N'-di-2-naphtyl-p-phenylenediamine, phenylisopropyl-phenylenediamine, 4,4'-dioctyldiphenylamine, 6-dodecyl-1,2-dihydro-2,2,4-trimethylquinoline and polymerized trimethyl-dihydroquinoline, or (5) a mixture of any of the compounds exemplified in above (1) to (4).

The degradation inhibiting effect of the diphenylamine derivative of this invention is markedly exhibited when it is used in fields in which rubber products or rubbery polymers containing it require a high level of degradation resistance for a long time when they make contact with solvents or oils or are immersed therein, for example in fuel hoses, printing rolls, textile spinning rolls, apron bands, packings, oil seals, diaphragms, fuel tanks, textile coating agents, or adhesives.

The following non-limitative Examples illustrate the present invention specifically.

SYNTHESIS EXAMPLE 1

36.8 g (0.2 mole) of p-aminodiphenylamine was added to 200 ml of toluene, and 16.8 g of sodium hydrogen carbonate and 30 ml of water was added. With stirring, 30.5 g (0.2 mole) of p-chloromethylstyrene was added dropwise to the mixture at 60° C. After the addition, the mixture was stirred at less than 60° C. for 4 hours. The resulting precipitate was separated, and washed with water to afford 49.8 g (yield 83%) of 4-anilino-N-(4-vinylbenzyl)aniline having a melting point of 143° C.

The results of elemental analysis of the product were as follows:

|  | C | H | N |
|---|---|---|---|
| Found (%): | 83.78, | 6.76, | 9.46 |
| Calculated (%): | 83.95, | 6.72, | 9.33 |

SYNTHESIS EXAMPLE 2

37.1 g (0.2 mole) of p-hydroxydiphenylamine was added to 200 ml of toluene, and 16.8 g of sodium hydrogen carbonate and 30 ml of water were added. With stirring, 30.5 g (0.2 mole) of p-chloromethylstyrene was added dropwise at 60° C. to the mixture. After the addition, the mixture was stirred at less than 60° C. for 4 hours. The resulting precipitate was washed with water to afford 48.8 g (yield 81%) of 4-anilinophenyl-4-vinylbenzyl ether having a melting point of 139° C.

The results of elemental analysis of the product were as follows:

|  | C | H | N | O |
|---|---|---|---|---|
| Found (%): | 83.51, | 6.40, | 4.82, | 5.27 |
| Calculated (%): | 83.67, | 6.37, | 4.65, | 5.31 |

SYNTHESIS EXAMPLE 3

20.6 g (0.1 mole) of sodium 4-vinylbenzenesulfonate was added to 200 ml of chloroform, and with stirring, 27.1 g (0.13 mole) of phosphorus pentachloride was gradually added at 5° C. After the addition, the mixture was stirred further for 1 hour. Chloroform was removed, and the product was washed with water and purified with ether to afford 16.3 g (yield 80.5%) of 4-vinylbenzenesulfonyl chloride. The resulting 4-vinylbenzenesulfonyl chloride was dissolved in 200 ml of toluene, and 14.8 g (0.08 mole) of p-aminodiphenylamine and 8 g of triethylamine were gradually added to the resulting solution. The mixture was stirred at 0° C. for 2 hours. The resulting precipitate was separated to afford 23.4 g (yield 83%) of N-(4-anilino)-phenyl-4-vinylbenzenesulfonamide having a melting point of 135° C.

The results of elemental analysis of this product were as follows:

|  | C | H | N | O | S |
|---|---|---|---|---|---|
| Found (%): | 68.40, | 5.19, | 8.08, | 9.21, | 9.08 |
| Calculated (%): | 68.53, | 5.23, | 8.00, | 9.13, | 9.15 |

SYNTHESIS EXAMPLE 4

12.7 g (0.1 mole) of vinylsulfonyl chloride prepared from sodium vinylsulfonate and phosphorus pentachloride was added to 200 ml of toluene, and 18.4 g (0.1 mole) of p-aminodiphenylamine and 10 g of triethylamine were gradually added to the solution. The mixture was stirred at 0° C. for 2 hours. The resulting precipitate was separated to afford 22.2 g (yield 81%) of N-(4-anilino)phenylvinylsulfonamide having a melting point of 126° C.

The results of elemental analysis of the product were as follows:

|  | C | H | N | O | S |
|---|---|---|---|---|---|
| Found (%): | 61.21, | 5.19, | 10.34, | 11.65, | 11.61 |
| Calculated (%): | 62.29, | 5.15, | 10.21, | 11.66, | 11.65 |

SYNTHESIS EXAMPLE 5

14.1 g (0.1 mole) of methallylsulfonyl chloride prepared from sodium methallylsulfonate and phosphorus pentachloride was added to 200 ml, and 18.4 g (0.1 mole) of p-aminodiphenylamine and 10 g of triethylamine were added gradually to the solution. The mixture was stirred at 0° C. for 2 hours. The resulting precipitate was separated to afford 23.9 g (yield 79%) of N-(4-anilino)-phenyl isopropenyl sulfonamide having a melting point of 129° C.

The results of elemental analysis of the product were as follows:

|  | C | H | N | O | S |
|---|---|---|---|---|---|
| Found (%): | 63.71, | 5.97, | 9.38, | 10.53, | 10.41 |
| Calculated (%): | 63.54, | 6.01, | 9.27, | 10.58, | 10.60 |

EXAMPLE 1

Compounds were prepared in accordance with the recipe shown in Table 1 using the diphenylamine derivative prepared in Synthesis Examples 1 to 5 or N-phenyl-N'-isopropyl-p-phenylenediamine as a comparison. Each of the compounds was press-cured at 160° C. for 20 minutes. The resulting vulcanized samples were subjected to a heat aging test (in accordance with JIS K-6301) and a sequential heat aging test.

The results are shown in Table 2.

TABLE 1

Compounding recipe

| Ingredients | Amounts (parts by weight) |
|---|---|
| NBR* | 100 |
| Stearic acid | 1 |
| Zinc oxide | 5 |
| FEF carbon | 40 |
| Sulfur | 0.3 |
| Tetramethylthiuram disulfide | 2.5 |
| N-cyclohexylbenzothiazyl sulfenamide | 2.0 |
| Diphenylamine derivative (Table 2), or N-phenyl-N'-isopropyl-p-phenylenediamine | 1.5 |

*Acrylonitrile content: 33% by weight Mooney viscosity (100° C., $ML_{1+4}$): 60

TABLE 2

| | Inhibitor Invention | | |
|---|---|---|---|
| Test Items | 4-Anilino-N-(4-vinyl-benzyl)-aniline | 4-Anilinophenyl-4-vinylbenzyl ether | N-(4-anilino)phenyl-4-vinylbenzenesulfonamide |
| Before aging | | | |
| Tensile strength (kg/cm²) | 238 | 240 | 251 |
| Elongation (%) | 510 | 490 | 530 |
| Hardness (JIS-A) | 65 | 65 | 65 |
| Heat aging test in a test tube (120° C., 96 hours) | | | |
| Percent change in tensile strength (%) | +5 | +5 | +5 |
| Percent change in elongation (%) | −26 | −27 | −22 |
| Change in hardness (point) | +7 | +6 | +5 |
| Heat aging test in a test tube (140° C., 48 hours) | | | |
| Percent change in tensile strength (%) | +7 | +7 | +8 |
| Percent change in elongation (%) | −29 | −32 | −29 |
| Change in hardness (point) | +8 | +8 | +8 |
| Sequential heat aging test (*) | | | |
| Percent change in tensile strength (%) | −8 | −9 | −9 |
| Percent change in elongation (%) | −27 | −25 | −28 |
| Change in hardness (point) | +3 | +4 | +4 |

| | Inhibitor | | |
|---|---|---|---|
| | Invention | | Comparison |
| Test Items | N-(4-anilino)phenyl-vinylsulfonamide | N-(4-anilino)phenyl-isopropenylsulfonamide | N-phenyl-N'-isopropyl-p-phenylenediamine |
| Before aging | | | |
| Tensile strength (kg/cm²) | 242 | 239 | 246 |
| Elongation (%) | 510 | 490 | 520 |
| Hardness (JIS-A) | 65 | 65 | 65 |
| Heat aging test in a test tube (120° C., 96 hours) | | | |
| Percent change in tensile strength (%) | +6 | +5 | +9 |
| Percent change in elongation (%) | −26 | −27 | −38 |
| Change in hardness (point) | +7 | +6 | +9 |
| Heat aging test in a test tube (140° C., 48 hours) | | | |
| Percent change in tensile strength (%) | +10 | +9 | +13 |
| Percent change in elongation (%) | −33 | −30 | −46 |
| Change in hardness (point) | +9 | +9 | +11 |
| Sequential heat aging test (*) | | | |
| Percent change in tensile strength (%) | −13 | −11 | −28 |
| Percent change in elongation (%) | −37 | −32 | −56 |
| Change in hardness (point) | +7 | +5 | +9 |

(*): The test sample was dipped in JIS Fuel C oil at 40° C. for 48 hours, and then subjected to a heat aging test in a test tube at 140° C. for 72 hours.

It is seen from the results shown in Table 2 that NBR having incorporated therein the diphenylamine derivative of this invention has markedly improved resistance to heat aging and sequential heat aging under very severe conditions.

EXAMPLE 2

A copolymer of butadiene and acrylonitrile (NBR) was prepared in accordance with the polymerization recipe shown in Table 3 using each of the diphenylamine derivatives prepared in Synthesis Examples 1 to 5 as a comonomer.

An about 1-liter pressure glass bottle was charged with the indicated materials except butadiene. Dissolved oxygen was removed by repeatedly reducing the pressure of the inside of the bottle and purging the inside of the bottle with nitrogen. Then, butadiene was fed into the bottle, and the bottle was closed. The pressure bottle was put into a water bath maintained at 5° C., and while rotating the bottle, the polymerization was carried out for 15 hours. The final polymerization conversion and the Mooney viscosity of the dried crumb recovered by salting out from the latex are shown in Table 3.

For comparison, an NBR latex prepared without using the diphenylamine derivative as a comomoner was admixed with 3 parts by weight, based on 100 parts by weight of rubber solids, of N,N'-diphenyl-p-phenylenediamine.

TABLE 3

| Polymerization recipe (Parts by weight) | Sample (*) Invention A | B | C | D | E | Comparison F |
|---|---|---|---|---|---|---|
| Butadiene | 58 | 58 | 58 | 58 | 58 | 58 |
| Acrylonitrile | 42 | 42 | 42 | 42 | 42 | 42 |
| Diphenylamine derivative | 3 | 3 | 3 | 3 | 3 | — |
| t-Dodecylmercaptan | 0.5 | 0.5 | 0.5 | 0.5 | 0.5 | 0.5 |
| Sodium dodecylbenzenesulfonate | 3 | 3 | 3 | 3 | 3 | 3 |
| Sodium carbonate | 0.2 | 0.2 | 0.2 | 0.2 | 0.2 | 0.2 |
| Sodium formaldehyde sulfoxylate | 0.05 | 0.05 | 0.05 | 0.05 | 0.05 | 0.05 |
| Ferrous sulfate | 0.008 | 0.008 | 0.008 | 0.008 | 0.008 | 0.008 |
| p-Menthane hydroperoxide | 0.04 | 0.04 | 0.04 | 0.04 | 0.04 | 0.04 |
| Water | 200 | 200 | 200 | 200 | 200 | 200 |
| Final conversion (%) | 91.2 | 92.0 | 91.3 | 92.0 | 91.6 | 91.8 |
| Mooney viscosity (100° C., $ML_{1+4}$) | 62 | 68 | 65 | 68 | 63 | 65 |

(*) A to F stand for the following compounds.
A: 4-anilino-N-(4-vinylbenzyl)aniline
B: 4-anilinophenyl-4-vinylbenzyl ether
C: N-(4-anilino)phenyl-4-vinylbenzenesulfonamide
D: N-(4-anilino)phenylvinylsulfonamide
E: N-(4-anilino)phenyl-isopropenylsulfonamide
F: N,N'-diphenyl-p-phenylenediamine

EXAMPLE 3

Compounds were prepared in accordance with the compounding recipe shown in Table 1 using the samples A, B, C, D and E obtained in Example 2 and containing the phenylenediamine derivative of this invention in the form of a segmeric unit, and the sample F containing N,N'-diphenyl-p-phenylenediamine. Each of the compounds was press-cured at 160° C. for 20 minutes, and the resulting vulcanized samples were subjected to a heat aging test and a sequential heat aging test.

The results are shown in Table 4.

TABLE 4

| Test Items | Sample Invention A | B | C | D | E | Comparison F |
|---|---|---|---|---|---|---|
| Before aging | | | | | | |
| Tensile strenght (kg/cm$^2$) | 242 | 232 | 241 | 246 | 235 | 230 |
| Elongation (%) | 510 | 530 | 510 | 490 | 520 | 500 |
| Hardness (JIS-A) | 65 | 65 | 65 | 65 | 66 | 66 |
| Heat aging test in a test tube (120° C., 96 hours) | | | | | | |
| Percent change in tensile sterngth (%) | +5 | +4 | +5 | +5 | +6 | +8 |
| Percent change in elongation (%) | −21 | −26 | −24 | −27 | −29 | −39 |
| Change in hardness (point) | +6 | +7 | +5 | +6 | +7 | +9 |
| Heat aging test in a test tube (140° C., 48 hours) | | | | | | |
| Percent change in tensile strength (%) | +5 | +6 | +7 | +10 | +10 | +12 |
| Percent change in elongation (%) | −25 | −24 | −28 | −32 | −33 | −44 |
| Change in hardness (point) | +8 | +8 | +7 | +8 | +9 | +11 |
| Sequential heat aging test (*) | | | | | | |
| Percent change in tensile strength (%) | −8 | −3 | −1 | −3 | −10 | −28 |
| Percent change in elongation (%) | −21 | −23 | −19 | −22 | −29 | −48 |
| Change in hardness (point) | +4 | +4 | +5 | +4 | +7 | +9 |

(*): The same as the footnote to Table 2.

It is seen from the results shown in Table 4 that NBR having incorporated therein the phenylenediamine derivative of this invention has markedly improved resistance to heat aging and sequential heat aging under very severe conditions.

What we claim is:

1. A diphenylamine derivative which is capable of inhibiting degradation of reactive rubbery polymers, said derivative being of the general formula

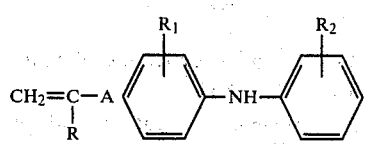

wherein R represents a hydrogen atom or a methyl group, $R_1$ and $R_2$, independently from each other, represent a hydrogen atom, a chlorine atom, a bromine atom, or a hydrocarbon radical having 1 to 12 carbon atoms, and A represents

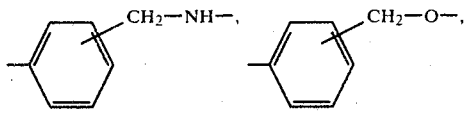

—SO$_2$—NH—, or —CH$_2$—SO$_2$—NH—.

2. The diphenylamine derivative of claim 1 wherein A represents

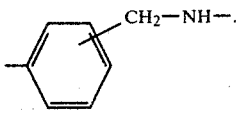

3. The diphenylamine derivative of claim 1 wherein A represents

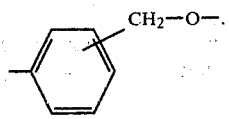

4. The diphenylamine derivative of claim 1 wherein A represents —SO$_2$—NH—.

5. The diphenylamine derivative of claim 1 wherein A represents —CH$_2$—SO$_2$—NH—.

6. The diphenylamine derivative of claim 1 which is 4-anilino-N-(4-vinylbenzyl) aniline.

7. The diphenylamine derivative of claim 1 which is 4-anilinophenyl-4-vinylbenzyl ether.

8. The diphenylamine derivative of claim 1 which is N-(4-anilino)phenyl-vinylsulfonamide.

9. The diphenylamine derivative of claim 1 which is N-(4-anilino)-phenyl isopropenyl sulfonamide.

10. A diene-type rubbery polymer composition comprising 100 parts by weight of a diene-type rubbery polymer and 0.01 to 10 parts by weight of the diphenylamine derivative of claim 1 as a degradation inhibitor.

11. The diene-type rubbery polymer composition according to claim 10 wherein said dephenylamine derivative is selected from groups consisting of 4-anilino-N-(4-vinylbenzyl) aniline, 4-anilinophenyl-4-vinylbenzyl ether, N-(4-anilino)phenyl-vinylsulfonamide and N-(4-anilino)-phenyl isopropenyl sulfonamide.

12. A diene-type rubbery polymer composition in which the diphenylamine derivative of claim 1 as a degradation inhibitor is chemically bound to a diene-type rubbery polymer in the form of a segmeric unit of the general formula

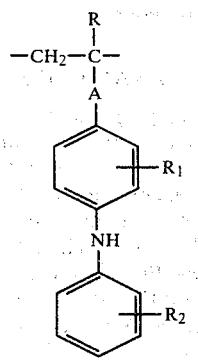

wherein R, R$_1$, R$_2$ and A are as defined.

* * * * *